(12) United States Patent
Kaneko et al.

(10) Patent No.: US 6,261,517 B1
(45) Date of Patent: Jul. 17, 2001

(54) RARE EARTH METAL-NICKEL HYDROGEN STORAGE ALLOY, A METHOD FOR PRODUCING THE SAME, AND ANODE FOR NICKEL-HYDROGEN RECHARGEABLE BATTERY

(75) Inventors: Akihito Kaneko, Kobe; Masafumi Irikawa, Miki; Yuji Tanibuchi, Himeji, all of (JP)

(73) Assignee: Santoku Metal Industry Co., Ltd., Hyogo-Ken (JP)

( * ) Notice: Subject to any disclaimer, the term of this patent is extended or adjusted under 35 U.S.C. 154(b) by 0 days.

(21) Appl. No.: 09/202,129
(22) PCT Filed: Sep. 5, 1997
(86) PCT No.: PCT/JP97/03126
§ 371 Date: Mar. 1, 1999
§ 102(e) Date: Mar. 1, 1999
(87) PCT Pub. No.: WO98/10107
PCT Pub. Date: Mar. 12, 1998

(30) Foreign Application Priority Data

Sep. 6, 1996 (JP) .................................................. 8-257541

(51) Int. Cl.⁷ .............................. C22C 19/03; C22C 19/00
(52) U.S. Cl. ...................... 420/455; 148/555; 420/900; 420/580; 429/218.2; 429/223; 429/224
(58) Field of Search ............................. 148/555; 420/900, 420/455, 580; 429/218.2, 223, 224

(56) References Cited

U.S. PATENT DOCUMENTS

| | | | |
|---|---|---|---|
| 5,085,944 | * 2/1992 | Ebato et al. | 428/570 |
| 5,512,385 | * 4/1996 | Komori et al. | 429/101 |
| 5,578,266 | * 11/1996 | Takai et al. | 420/83 |
| 5,629,000 | * 5/1997 | Matsuura et al. | 429/218 |
| 5,766,792 | * 6/1998 | Hirosawa et al. | 429/59 |
| 5,858,571 | * 1/1999 | Ishii et al. | 429/59 |
| 5,864,072 | * 1/1999 | Kobayashi et al. | 75/246 |
| 5,916,519 | * 6/1999 | Saito et al. | 420/455 |
| 6,013,387 | * 1/2000 | Yao et al. | 429/59 |
| 6,053,995 | * 4/2000 | Tanibuchi et al. | 148/538 |
| 6,068,948 | * 5/2000 | Imoto et al. | 429/218.2 |

FOREIGN PATENT DOCUMENTS

| | | |
|---|---|---|
| 3-161149 | 7/1991 | (JP) . |
| 7-97648 | 4/1995 | (JP) . |
| 7-268519 | 10/1995 | (JP) . |
| 7-286225 | 10/1995 | (JP) . |
| 9-298059 | 11/1997 | (JP) . |

* cited by examiner

Primary Examiner—Roy King
Assistant Examiner—Nicole Coy
(74) Attorney, Agent, or Firm—Darby & Darby

(57) ABSTRACT

A rare earth metal-nickel hydrogen storage alloy of a composition represented by the formula:

$$RNi_aMn_bCo_cAl_dX_e$$

(R stands for one or more rare earth elements including Sc and Y, not less than 95 atom % of which is one or more elements selected from the group consisting of La, Ce, Pr, and Nd; X stands for one or more elements selected from the group consisting of Fe, Cu, Zn, V, and Nb; a, b, c, d, and e satisfy the relations of $3.9 \leq a < 6.0$, $0.45 \leq b < 1.5$, $0.01 \leq c < 0.3$, $0.4 \leq d \leq 1$, $0 \leq e \leq 0.2$, and $5.2 \leq a+b+c+d+e \leq 7.5$), the alloy having a matrix of $CaCu_5$ structure, and a Mn-rich secondary phase of 0.3 to 5 μm finely dispersed in the matrix at surface ratio of 0.3 to 7%; a method for producing the same; and an anode for a nickel-hydrogen rechargeable battery containing as anode material the hydrogen storage alloy and an electrically conductive material.

15 Claims, 2 Drawing Sheets

RARE EARTH METAL-NICKEL HYDROGEN STORAGE ALLOY, A METHOD FOR PRODUCING THE SAME, AND ANODE FOR NICKEL-HYDROGEN RECHARGEABLE BATTERY

FIELD OF ART

The present invention relates to a rare earth metal-nickel hydrogen storage alloy, a method for producing the same, and an anode for a nickel-hydrogen rechargeable battery. In particular, the present invention relates to an anode for a nickel-hydrogen rechargeable battery having high electrode capacity, long service life, and excellent high rate charge-discharge performance at an ordinary temperature as well as excellent high rate discharge performance at lower temperatures (collectively referred to as "high rate charge-discharge performance" hereinbelow), a rare earth metal-nickel hydrogen storage alloy that can be used as a starting material for such anode, and a method for producing the same.

BACKGROUND OF THE INVENTION

Hydrogen storage alloys predominantly used these days in preparation of anodes for nickel-hydrogen rechargeable batteries are $AB_5$ type alloys ($CaCu_5$ type structure) that have light rare earth elements such as La, Ce, Pr, Nd, or a mixture of these elements (misch metal) in A-site, and Ni, Co, Mn, and/or Al in B-site. This kind of alloys has a larger hydrogen storage capacity than other alloys, and hydrogen absorption-desorption pressure (equilibrium pressure) of 1 to 5 atmospheres at an ordinary temperature, which make the alloys usable. These alloys are generally composed of 0.4 to 0.8 of Co, 0.3 to 0.5 of Mn, 0.2 to 0.4 of Al, and less than 3.9 of Ni per one rare earth metals in atomic ratio, for the sake of adjustability of equilibrium pressure and corrosion resistance against the electrolyte in the battery.

The nickel-hydrogen rechargeable batteries have recently made rapid prevalence in the field of laptop computers, cellular phones, and portable audio equipment. Electric vehicles equipped with such batteries will be put to practical use before long. As a result of diversification of battery usage, there have developed demands not only for high electrode capacity and long service life (cycle life) of the batteries, but also for high rate charge-discharge performance, i.e. heavy current charge-discharge performance or high rate discharge performance at lower temperatures, as important characteristics, to keep up with higher output of equipment or use in cold district.

For the purpose of improving the electrode capacity, JP-A-6-145851, for example, proposes to reduce the Ni content with respect to rare earth metal content, that is, an alloy of rare earth-rich composition. In this measure, however, the higher content of rare earth metals causes the corrosion resistance against electrolyte to decrease, resulting in disadvantage for battery life.

JP-A-7-97648, for example, proposes another measure for improving the electrode capacity, wherein a portion of the alloy is substituted by Mn, and the alloy melt is rapidly cooled and solidified to form a columnar crystal structure of a particular size. This method gives the alloy a fine crystal structure by the rapid cooling and reduced segregation of Mn, thereby improving the electrode capacity and cycle life to a certain degree. However, excess amount of Mn causes corrosion at the segregation to lower the cycle life, and no remarkable improvement is achieved in the high rate charge-discharge performance compared to that of the conventional alloy.

In an attempt to improve the high rate charge-discharge performance, there is proposed to plate the surface of a hydrogen storage alloy with nickel for utilizing the catalytic effect of nickel. However, repeated charging and discharging of the battery decrepitates the alloy to form fresh surfaces, thereby diminishing the effect of nickel plating.

It is conventionally believed to be essential for improving the corrosion resistance against the electrolyte and for improving the battery life, to add Co in an amount of not less than 4% by weight, usually about 10% by weight. However, addition of Co adversely affects the activity of the hydrogen storage alloy (easiness to desorb hydrogen), and adds greatly to the cost of the alloy. Therefore, substitution for Co addition is demanded.

DISCLOSURE OF THE INVENTION

It is an object of the present invention to provide a rare earth metal-nickel hydrogen storage alloy which has both high electrode capacity and excellent cycle life, and which also has excellent high rate charge-discharge performance compared to conventional alloys, and a method for producing such alloy, and an anode for a nickel-hydrogen rechargeable battery produced with such alloy.

It is another object of the present invention to provide a rare earth metal-nickel hydrogen storage alloy which combines high electrode capacity, long cycle life, and high rate charge-discharge performance at low cost by remarkably reduced content of expensive cobalt, a method for producing such alloy, and an anode for a nickel-hydrogen rechargeable battery produced with such alloy.

The present inventors have made intensive studies on the effect of each alloy element and of production conditions such as cooling and heat treatment conditions, on the electrode capacity, cycle life, and high rate charge-discharge performance of R (rare earth metals)-Ni—Mn—Co—Al-containing hydrogen storage alloys. As a result, it has been revealed that an increased amount of Ni favorably affects the corrosion resistance and high rate charge-discharge performance under certain alloy production conditions. However, in order to compensate the lowered corrosion resistance due to Co reduction simply by increased amount of Ni, Ni content 1.5 times the Co content was required, which was found to result in decreased electrode capacity. In this case, the alloy was composed of two separate phases of an $AB_5$ type matrix ($CaCu_5$ type structure) and a Ni-rich phase of cubic system. It is believed that low hydrogen storage capacity of this cubic system leads to decrease in the hydrogen storage capacity and electrode capacity of the overall alloy.

Thus, the inventors have searched for measures for suppressing formation of the distinct Ni-rich phase to dissolve as much Ni as possible into $AB_5$ type matrix. As a result, they have revealed that addition of more than the conventional standard amount of Mn together with Ni, and control of alloy melt cooling conditions during alloy production could make more Ni and Mn dissolved in the solid solution, leading to improvement in the high rate charge-discharge performance. The inventors have also found that addition of a small amount of one or more elements selected from the group consisting of Fe, Cu, Zn, V, and Nb to the above-mentioned composition contributes to further increase in the amount of Ni and Mn dissolved in the solid solution. Specifically, the inventors prepared a R—Ni—Mn—Co—Al-containing alloy melt with the Mn content of not less than 0.45 and less than 1.5 per one R in atomic ratio, and solidified the alloy melt using a roll casting device having a roll with a surface roughness of 7 to 100 µm in ten-point mean roughness (Rz) into a 0.02 to 0.5 mm thick solidified alloy. As a result, the total content of Ni, Mn, and Co in B-site could be increased to the range of 5.2 to 7.5 per one R in atomic ratio beyond the conventional recognition, and thus the Ni content could also be increased to the range of 3.9 to 6, exceeding the conventional range. Therefore, the high rate charge-discharge performance was improved. Incidentally, the atomic ratio of the elements in B-site of the conventionally used $AB_5$ type alloy is less than 5.2.

However, aiming at reduction of the alloy cost by reducing Co content, which is one of the objects of the present invention, when the Co content in the above composition with higher Mn content was reduced to less than 0.3 in atomic ratio, a battery with an anode made of such alloy exhibited somewhat shorter cycle life compared to a conventional battery. The reasons for the shorter cycle life are believed to be the tendency of the more than the conventional amount of Mn in the solid solution matrix to dissolve in the alkali electrolyte in the battery, and relatively low solubility of Mn in the electrolyte, which cause precipitation of manganese hydroxide around the Mn-dissolving regions to narrow the active regions on the alloy surface.

Therefore, the present inventors have made further improvement in the morphology control of Mn. Their researches have revealed that the above problems in cycle life could be solved by generating a novel alloy crystal structure in an $AB_5$ type master alloy ($CaCu_5$ type structure) that has been obtained by solidifying the above-mentioned alloy melt with high Mn—, Ni—and low Co-contents in the above-mentioned device for rapid solidification of alloy melt under the rapidly cooling conditions. This crystal structure is composed of 0.3 to 7% in surface ratio of 0.3 to 5 µm secondary phase richer in Mn than the matrix and finely dispersed in the matrix of the master alloy. The "Mn-rich secondary phase" in the present invention is defined as a phase exhibiting the X-ray intensity of Mn not lower than 1.5 times the average X-ray intensity of Mn in the matrix as determined by EPMA analysis. The inventors have found that the particular arrangement of such secondary phase can be achieved by heating the master alloy at 700 to 950° C. for 0.1 to 12 hours under vacuum or inert atmosphere, thereby completing the present invention.

According to the present invention, there is provided a rare earth metal-nickel hydrogen storage alloy of a composition represented by the formula:

$RNi_aMn_bCo_cAl_dX_e$ wherein R stands for one or more rare earth elements including Sc and Y, not less than 95 atom % of which is one or more elements selected from the group consisting of La, Ce, Pr, and Nd; X stands for one or more elements selected from the group consisting of Fe, Cu, Zn, V, and Nb; a, b, c, d, and e satisfy the relations of $3.9 \leq a < 6.0$, $0.45 \leq b < 1.5$, $0.01 \leq c < 0.3$, $0.4 \leq d \leq 1$, $0 \leq e \leq 0.2$, and $5.2 \leq a+b+c+d+e \leq 7.5$ (referred to as composition A hereinbelow), said alloy having a matrix of $CaCu_5$ structure, and a Mn-rich secondary phase of 0.3 to 5 µm size finely dispersed in said matrix at surface ratio of 0.3 to 7%.

According to the present invention, there is also provided a method for producing the above rare earth metal-nickel hydrogen storage alloy comprising the steps of:

(a) supplying onto a roll with a surface roughness of 7 to 100 µm in ten-point mean roughness (Rz) an alloy melt of a composition represented by the above formula to solidify said alloy melt into an alloy of 0.02 to 0.5 mm in thickness, and (b) heating said alloy at 700 to 950° C. for 0.1 to 12 hours under vacuum or inert atmosphere.

According to the present invention, there is further provided an anode for a nickel-hydrogen rechargeable battery comprising as anode materials the rare earth metal-nickel hydrogen storage alloy and an electrically conductive material.

PREFERRED EMBODIMENTS OF THE PRESENT INVENTION

Figure 1:
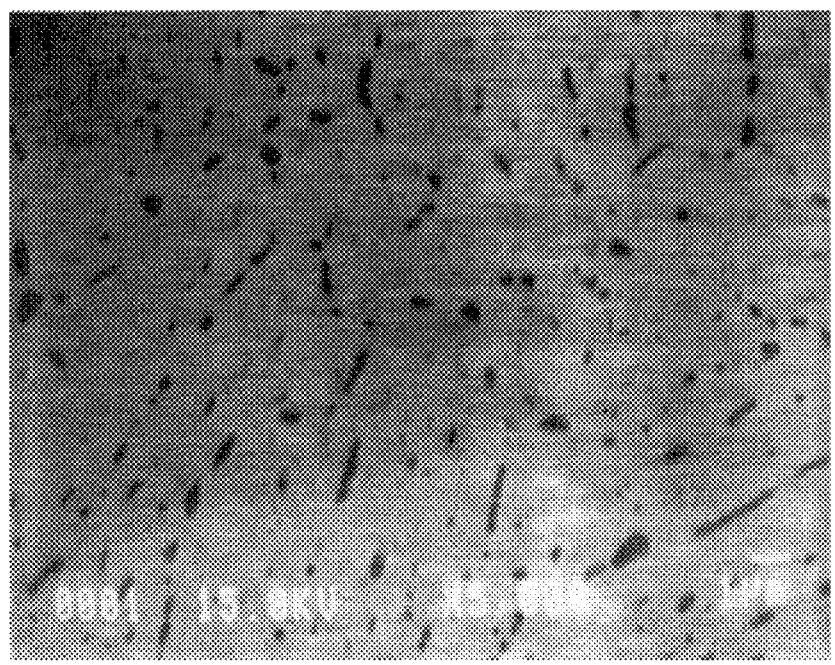
FIG. 1 is a photograph showing a compositional image of the hydrogen storage alloy prepared in Example 1 taken at ×5000 magnification by X-ray microanalyzer (trade name "JOEL-8600") manufactured by JOEL LTD.

The hydrogen storage alloy of the present invention has composition A represented by the formula mentioned above. In the formula, R is selected from rare earth elements including Sc and Y. Not less than 95 atom % of R is composed of one or more elements selected from the group consisting of La, Ce, Pr, and Nd. R may preferably be selected to contain 20 to 60 atom % La, 0 to 60 atom % Ce, 0 to 50 atom % Pr, and 0 to 50 atom % Nd. Misch metal may be used as a starting material for industrial production.

In the formula, "a" associated with Ni expresses the atomic ratio of Ni per one R (the same is applied to the cases below), and is in the range of $3.9 \leq a$ "<6", preferably $4.5 \leq a \leq 5.5$. If "a" is less than 3.9, excellent high rate charge-discharge performance and corrosion resistance cannot be achieved, and thus long cycle life cannot be obtained. If "a" is 6 or more, the electrode capacity is lowered.

"b" associated with Mn is in the range of $0.45 \leq b < 1.5$, preferably $0.7 \leq b \leq 1.3$. If "b" is less than 0.45, sufficient effect of extending the Ni dissolution range in the matrix is not achieved. If "b" is 1.5 or more, the corrosion resistance is lowered.

"c" associated with Co is in the range of $0.01 \leq c < 0.3$, preferably $0.02 \leq c \leq 0.2$. If "c" is less than 0.01, sufficient corrosion resistance cannot be achieved. If "c" is 0.3 or more, the activity of the alloy decreases and the cost of the alloy increases.

"d" associated with Al is in the range of $0.4 \leq d \leq 1$, preferably $0.5 \leq d \leq 0.7$. If "d" is less than 0.4, the hydrogen equilibrium pressure of the alloy increases, and the corrosion resistance of the alloy decreases. If "d" is more than 1, the electrode capacity decreases.

Fe has, in the range of $5 < a+b+c+d+e$, effects of extending the composition range that gives the CaCu5 type structure and of improving the corrosion resistance of the alloy. However, excess Fe content decreases the hydrogen storage capacity. Thus, when X is Fe, "e" is in the range of $0 \leq e \leq 0.2$, preferably $0.05 \leq e \leq 0.15$.

Cu has, in the range of 5<a+b+c+d+e, an effect of extending the composition range that gives the $CaCu_5$ type structure. However, excess Cu content decreases the hydrogen storage capacity. Thus, when X is Cu, "e" is in the range of $0 \leq e \leq 0.2$, preferably $0.05 \leq e \leq 0.12$.

V has, in the range of 5<a+b+c+d+e, effects of extending the composition range that gives the CaCu5 type structure and of increasing the hydrogen storage capacity of the alloy. However, excess V content adversely affect the corrosion resistance. Thus, when X is V, "e" is in the range of $0 \leq e \leq 0.2$, preferably $0.02 \leq e \leq 0.15$.

Nb, like Cu, has an effect of extending the composition range that gives the $CaCu_5$ type structure, in the range of 5<a+b+c+d+e. However, excess Nb content causes Nb-rich precipitates to generate, resulting in sharp drop in the hydrogen storage capacity. Thus, when X is Nb, "e" is in the range of $0 \leq e \leq 0.2$, preferably $0.03 \leq e \leq 0.12$.

Zn has an effect of increasing hydrogen storage capacity of the alloy, but a large amount of Zn is hard to be added since the boiling point of Zn is lower than that of the alloy. Thus, when X is Zn, "e" is in the range of $0 \leq e \leq 0.2$, preferably $0.03 \leq e \leq 0.12$.

The above-mentioned a, b, c, d, and e should satisfy the conditions of $5.2 \leq a+b+c+d+e \leq 7.5$, preferably $6 < a+b+c+d+e \leq 7$. When a+b+c+d+e is less than 5.2, high rate charge-discharge performance and corrosion resistance cannot be obtained, and when more than 7.5, the electrode capacity is lowered.

The hydrogen storage alloy of the present invention should have composition A and the structure wherein Mn-rich secondary phase of 0.3 to 5 μm, preferably of 0.5 to 2 μm, is finely dispersed in a matrix of $CaCu_5$ structure in the surface ratio of 0.3 to 7%, preferably 1 to 7%. With the secondary phase of less than 0.3 μm, the corrosion protection cannot be obtained. With the secondary phase of more than 5 μm, the corrosion resistance is extremely lowered. When the surface ratio of the secondary phase is less than 0.3%, the corrosion protection cannot be obtained, and when more than 7%, the corrosion resistance is extremely lowered. Incidentally, the surface ratio used in the present specification may be determined by analyzing the EPMA compositional image of a cross-section of an alloy sample.

The hydrogen storage alloy of the present invention has excellent high rate charge-discharge performance while it maintains high electrode capacity. The reason for this may be that the matrix of $AB_5$ type is maintained while the Ni content at B-site is nonstoichiometrically large, which gives catalytic activity advantageous for absorption and desorption of hydrogen. The cycle life is also improved in the alloy of the present invention. This improvement may be attributed to the reduction of Mn in the solid solution matrix by precipitating and finely dispersing the Mn-rich secondary phase through the particular heat treatment and the like to be discussed later. This restricts occurrence of alkaline electrolyte-induced corrosion to the secondary phase regions, which function as a kind of sacrificial region.

For preparation of the hydrogen storage alloy of the present invention, an alloy melt of composition A is first supplied onto a roll with the particular surface roughness of a roll casting device to solidify the alloy melt into an alloy of 0.02 to 0.5 mm in thickness in step (a), thereby obtaining a master alloy in the form of strips and the like. The alloy melt may be prepared by melting a starting material metal mixture blended to have composition A in a crucible or the like under vacuum or inert atmosphere by vacuum melting or high frequency melting method.

The roll casting device has single or double internally water-cooled rolls, and cools and solidifies the alloy melt on the roll surface or between the roll surfaces. It is conventionally known to use this kind of device for production of hydrogen storage alloys. However, in the present invention, the surface roughness of the roll is set to 7 to 100 μm, preferably 10 to 40 μm in ten-point mean roughness (Rz). If Rz is more than 100 μm, the solidified alloy does not peel off the roll easily, which adversely affects smooth operation. Generally used roll casting devices have rolls having the surface roughness of only about 5 μm or less in Rz, or even almost mirror finished surface.

Incidentally, the ten-point mean roughness (Rz) is defined in JIS B0601-1994 (corresponding to ISO 468), and represents the sum of the average absolute value of the altitudes of from the highest to the fifth highest peaks and that of from the deepest to the fifth deepest valleys, both measured vertically from the average line of the roll surface profile. This roughness (Rz) may be measured using a commercially available stylus type digital surface roughness measuring device in accordance with the JIS. Such surface roughness may be given to a roll by grinding a roll surface with a grinder for abrasion finishing of a roll that has selected kind and particle size (count) of abrasive grains, or by working a roll surface into irregular profile by shot blasting, sand blasting, or the like.

The mechanism of the contribution of the roll surface roughness control to the properties of the hydrogen storage alloy of the present invention has not been developed sufficiently. However, one factor of the mechanism may be that appropriate irregularity of the roll surface gives anchor effect to facilitate holding of the supplied alloy on and in contact with the roll surface, ensuring cooling effect sufficient for solidifying and collecting the alloy with nonstoichiometric composition of the present invention in the form of a solid solution. As another factor, fine precipitates functioning as nuclei for generation of the Mn-rich secondary phase of particular size and distribution during the heat treatment to be discussed later are formed during the roll casting process, and the roll surface roughness may have influence on the amount of the nuclei to be formed. With the conventional, almost mirror-finished roll surface, too fine and too many nuclei are formed, so that effective adjustment of the secondary phase defined in the present invention cannot be achieved in the subsequent heating.

The cooling rate of the alloy melt on the particular roll casting device is not particularly limited as long as the alloy melt can be solidified on the roll surface having the particular surface roughness into an alloy with the particular thickness. Usually, the cooling rate may be not lower than 500° C./sec., preferably 1000 to 10000° C./sec.

The hydrogen storage alloy of the present invention may be produced not only by the above method using the roll casting device, but also by cooling and solidifying the alloy melt into an alloy of the particular thickness on a rotary disk casting device having a surface roughness adjusted to that mentioned above.

Next, the master alloy obtained in the form of strips of 0.02 to 0.5 mm in thickness is heated under vacuum or inert atmosphere under particular temperature conditions in step (b). The temperature conditions include heating at 700 to 950° C., preferably 800 to 900° C., for 0.1 to 12 hours, preferably 3 to 10 hours. As a result of the heating, the Mn-rich secondary phase particularly defined in the present invention precipitates from the matrix, and thus the hydrogen storage alloy of the particular composition and structure having improved corrosion resistance and cycle life can be obtained. The alloy to be subjected to this heating maybe in the form of the strips as cast, coarsely crushed pieces, pulverized powders, or the like. After the heating, the alloy may be subjected to ordinary crushing and finely pulverizing steps to prepare hydrogen storage alloy powders.

The anode for a nickel-hydrogen rechargeable battery of the present invention contains the hydrogen storage alloy mentioned above and an electrically conductive material as anode materials.

The hydrogen storage alloy is preferably pulverized before use into powders of preferably 20 to 100 μm, more preferably 40 to 50 μm in uniform size. The pulverization may be carried out by coarsely crushing the alloy in a stamp mill, followed by mechanical pulverization in a non-oxidizing solvent such as hexane in a planetary ball mill. The content of the hydrogen storage alloy is preferably 70 to 95% by weight, more preferably 80 to 90% by weight of the entire anode materials. If the content is less than 70% by weight, the hydrogen storage capacity of the resulting anode is lowered, and the electrode capacity can hardly be increased, thus being not preferred. If the content exceeds 95% by weight, the electrical conductivity as well as durability is lowered, thus being not preferred.

The electrically conductive material may be powders of copper, nickel, cobalt, carbon, or a mixture thereof, having the particle size of about 1 to 10 μm. The content of the electrically conductive material is preferably 5 to 20% by weight, more preferably 10 to 20% by weight of the entire anode materials.

The anode for a nickel-hydrogen rechargeable battery of the present invention may optionally contain a binder in addition to the above essential components. Preferred examples of the binder may include ethylene tetrafluoride-propylene hexafluoride copolymer (FEP), polytetrafluoroethylene, and carboxymethyl cellulose. Preferred content of the binder is not more than 10% by weight of the entire anode materials.

The anode for a nickel-hydrogen rechargeable battery of the present invention may be prepared by binding the anode materials on a collector body such as nickel mesh, nickel or copper expanded metal, nickel or copper punched metal, foamed nickel, or woolen nickel, by rolling press method or molding press method. The obtained anode may be in the form of a sheet or a pellet. The resulting anode may be used in the same way as the ordinary anode for a nickel-hydrogen rechargeable battery to compose a rechargeable battery.

The anode for a nickel-hydrogen rechargeable battery of the present invention contains as a starting material the rare earth metal-nickel hydrogen storage alloy of the present invention having the particular composition and structure. Thus, the anode of the present invention not only has both high electrode capacity and excellent cycle life, but also is superior in high rate charge-discharge performance compared to the conventional alloys. Further, the rare earth metal-nickel hydrogen storage alloy of the present invention as the starting material has the composition with a remarkably reduced content of expensive cobalt, so that the anode of the present invention exhibits the excellent properties as mentioned above at lower cost. In addition, the method of the present invention facilitates production of such rare earth metal-nickel hydrogen storage alloy.

EXAMPLES

The present invention will now be explained with reference to Examples and Comparative Examples, but is not limited thereto.

Example 1

Metals of Mm (misch metal), Ni, Mn, Co, and Al were measured out so that the composition of the starting material was as shown in atomic ratio in Table 1, and melted in a high frequency induction furnace under argon atmosphere to thereby prepare an alloy melt. The misch metal (Mm) (manufactured by Santoku Metal Industry Co., Ltd.) used in this Example was composed of 25 atom % La, 50 atom % Ce, 5 atom % Pr, and 20 atom % Nd. Subsequently, the alloy melt was held at 1450° C., and then rapidly cooled on a water-cooled copper roll having a surface roughness of 10 μm in ten-point mean roughness (Rz) of a single-roll casting device at a cooling rate of 1000 to 3000° C./sec to prepare 0.1 to 0.3 mm thick alloy flakes. The alloy flakes thus obtained were heated at 900° C. for 5 hours under argon atmosphere to precipitate the Mn-rich phase, and thus a hydrogen storage alloy was obtained.

Figure 2:
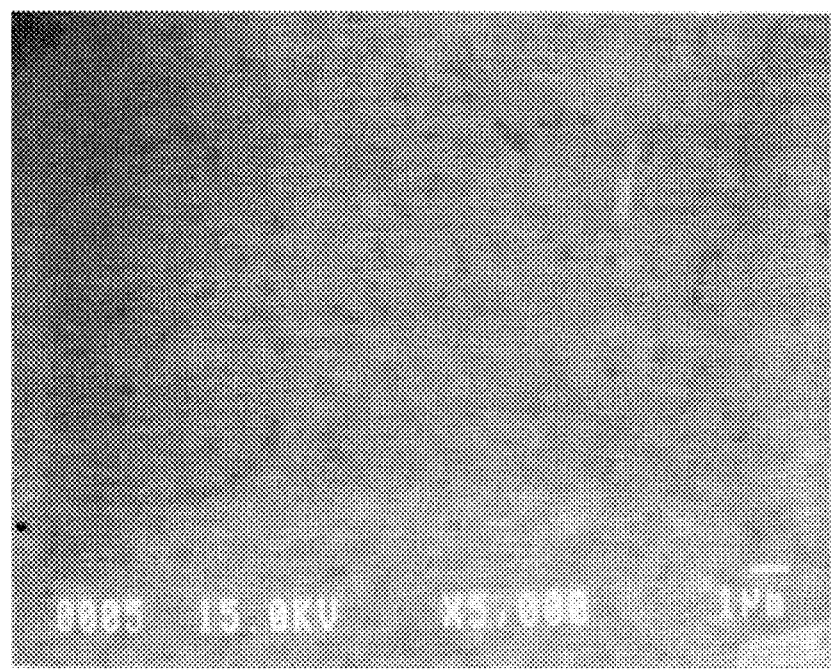
FIG. 2 is a photograph showing a compositional image of the alloy flake prepared in Example 1 taken at ×5000 magnification by X-ray microanalyzer (trade name "JOEL-8600") manufactured by JOEL LTD.

The crystal structure of the obtained hydrogen storage alloy was determined by an X-ray diffractometer manufactured by RIGAKU CORPORATION. It was confirmed that the matrix has $CaCu_5$ type single phase structure. Further, the alloy was observed under X-ray microanalyzer (trade name "JEOL-8600) manufactured by JEOL LTD. at x5000 magnification. The obtained compositional image was analyzed by image analyzer (manufactured by ASAHI CHEMICAL INDUSTRY CO., LTD., trade name "IP1000") to determine the size and surface ratio of the precipitated Mn-rich phase. The photograph showing the compositional image is shown in FIG. 1, wherein the Mn-rich phase is shown as black spots. The results of the analysis are shown in Table 2. For the sake of comparison, the compositional image before heating of the alloy flakes was observed in the same way. The photograph showing the compositional image is shown in FIG. 2. Comparison of FIGS. 1 and 2 reveals that precipitation of the particular Mn-rich secondary phase is generated by heating.

Next, the heat-treated hydrogen storage alloy was subjected to measurements of hydrogen storage capacity and hydrogen storage pressure in accordance with JIS H7201 (1991) "Method for Measuring Pressure-Composition Diagram (PCT curve) of Hydrogen Storage Alloy" using an automated Sieverts-type PCT measuring apparatus (manufactured by LESCA CO., LTD.). The results of the measurements at 40° C. under 5 atmospheres are shown in Table 2.

The heat-treated hydrogen storage alloy was coarsely crushed in a stamp mill, and further pulverized in a planetary ball mill in a hexane solvent into powders with an average particle size of 80 μm . 10 g of the obtained powders, 1 g of copper powders as the electrically conductive material, and 0.3 g of FEP (ethylene tetrafluoride-propylene hexafluoride copolymer) powders as a binder were mixed together to prepare a 20 mm diameter pellet electrode. With the electrode, immersed in a 6N KOH solution, and a mercury oxide reference electrode, a battery was assembled, which was measured for electrode characteristics by potentiogalvanostat (manufactured by HOKUTO DENKO CORPORATION). The results are shown in Table 2. The electrode capacity was measured by discharging the electrode at 0.2 C, 1 C, and 3 C, respectively, at 25° C. for evaluating the high rate discharge performance at an ordinary temperature, and also at 1 C at −10° C. for evaluating the high rate discharge performance at a low temperature. The results are shown in Table 2. Discharging at 1 C means discharging at a current value for discharging the nominal capacity of the alloy in 1 hour. The electrode capacity is usually measured by discharging at 0.2 C. Discharging at 1 C and 3 C are conducted at current values 5 times and 15 times the value at 0.2 C, respectively. In the present invention, discharging at 1 C and 3 C are called high rate discharge. The nominal capacity of the alloy was supposed to be 300 mAh/g.

For evaluating the electrode cycle life, the constant level of the battery capacity reached was used as the standard, and the capacity after 500 cycles of charge and discharge at 1 C at 25° C. was compared with the standard to give the capacity maintenance ratio. The results are shown in Table 2.

Examples 2 to 11

Figure 3:
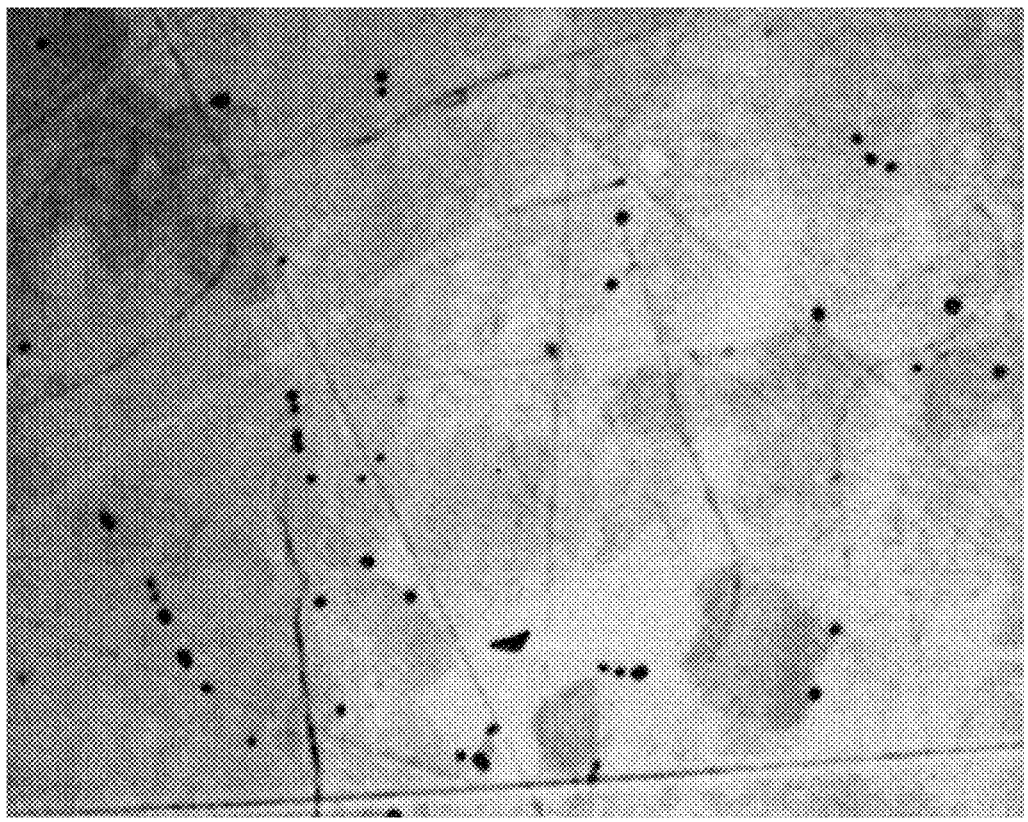
FIG. 3 is a photograph showing a compositional image of the hydrogen storage alloy prepared in Example 8 taken at ×5000 magnification by X-ray microanalyzer (trade name "JOEL-8600") manufactured by JOEL LTD.

Hydrogen storage alloys were prepared in the same way as in Example 1 except that the alloy compositions, roll surface roughnesses, and heat treatment conditions were set as shown in Table 1. The resulting hydrogen storage alloys and the batteries produced with these alloys were subjected to the measurements as in Example 1. The results are shown in Table 2. The compositional image similar to FIG. 1 of the heat-treated alloy containing Fe as element X prepared in Example 8 is shown in FIG. 3. Precipitation of Mn-rich secondary phase similar to that in FIG. 1 was observed in the compositional image of the alloy shown in FIG. 3.

Comparative Examples 1 to 6

Hydrogen storage alloys were prepared in the same way as in Example 1 except that the alloy compositions, roll surface roughnesses, and heat treatment conditions were set as shown in Table 1. The resulting hydrogen storage alloys and the batteries produced with these alloys were subjected to the measurements as in Example 1. The results are shown in Table 2.

The alloy prepared in Comparative Example 1 had the composition currently in common use. This alloy exhibited high hydrogen storage capacity and electrode capacity at 25° C. at 0.2 C, but inferior high rate discharge performance compared to the alloy of the present invention. The alloy prepared in Comparative Example 2 had a composition wherein Mn content was maintained at a conventional level, and Co was substituted by Ni. This alloy exhibited inferior electrode capacity and capacity maintenance ratio. The alloy prepared in Comparative Example 3 had a composition wherein Co content is beyond the range of the present invention. In this alloy, Ni-rich phase was observed, and Mn-rich phase grew too large. This alloy exhibited inferior hydrogen storage capacity and electrode capacity. In Comparative Example 4, a hydrogen storage alloy was prepared under the same conditions as in Example 3 except that the roll surface roughness (Rz) was 4 μm to simulate the conventional roll. The resulting alloy contained too fine Mn-rich phase, which falls outside the preferred range of the present invention, and exhibited inferior capacity maintenance ratio compared to the alloy of Example 3. In Comparative Examples 5 and 6, hydrogen storage alloys were prepared in the same way as in Example 3 except that the heating temperatures were below (Comparative Example 5) or above (Comparative Example 6) the temperature range of the present invention. The resulting alloys contained too fine or too coarse Mn-rich phase, respectively, compared to the alloy of Example 3, and exhibited inferior capacity maintenance ratio.

TABLE 1

| | | Composition (atomic ratio) | | | | | | | | Roll Roughness | Heating Conditions | |
|---|---|---|---|---|---|---|---|---|---|---|---|---|
| | | Mm | Sc | Y | Ni(a) | Mn(b) | Co(c) | Al(d) | X(e) | sum of a + b + c + d + e | Rz (μm) | Temp. (° C.) | Time (h) |
| Ex. | 1 | 1 | — | — | 4.3 | 0.7 | 0.2 | 0.5 | — | 5.7 | 10 | 900 | 5 |
| | 2 | 1 | — | — | 4.65 | 0.8 | 0.1 | 0.55 | — | 6.1 | 23 | 870 | 6 |
| | 3 | 1 | — | — | 4.85 | 1.0 | 0.1 | 0.55 | — | 6.5 | 32 | 860 | 6 |
| | 4 | 1 | — | — | 5.0 | 1.2 | 0.05 | 0.55 | — | 6.8 | 35 | 850 | 6 |
| | 5 | 1 | — | — | 5.25 | 1.4 | 0.05 | 0.6 | — | 7.3 | 44 | 830 | 8 |
| | 6 | 0.97 | 0.03 | — | 4.85 | 1.0 | 0.1 | 0.55 | — | 6.5 | 38 | 870 | 6 |
| | 7 | 0.97 | — | 0.03 | 4.85 | 1.0 | 0.1 | 0.55 | — | 6.5 | 28 | 865 | 6 |
| | 8 | 1 | — | — | 4.75 | 1.0 | 0.1 | 0.55 | Fe 0.1 | 6.5 | 32 | 860 | 6 |
| | 9 | 1 | — | — | 4.75 | 1.0 | 0.1 | 0.55 | Cu 0.1 | 6.5 | 32 | 860 | 6 |
| | 10 | 1 | — | — | 4.75 | 1.0 | 0.1 | 0.55 | V 0.1 | 6.5 | 32 | 860 | 6 |
| | 11 | 1 | — | — | 3.95 | 0.5 | 0.25 | 0.45 | Fe 0.05 | 5.2 | 32 | 860 | 6 |
| Comp. Ex. | 1 | 1 | — | — | 3.6 | 0.4 | 0.7 | 0.3 | — | 5.0 | 10 | 900 | 5 |
| | 2 | 1 | — | — | 5.45 | 0.4 | 0.1 | 0.55 | — | 6.5 | 33 | 860 | 6 |
| | 3 | 1 | — | — | 4.35 | 1.0 | 0.5 | 0.55 | — | 6.5 | 36 | 860 | 6 |
| | 4 | 1 | — | — | 4.85 | 1.0 | 0.1 | 0.55 | — | 6.5 | 4 | 860 | 6 |
| | 5 | 1 | — | — | 4.85 | 1.0 | 0.1 | 0.55 | — | 6.5 | 34 | 500 | 6 |
| | 6 | 1 | — | — | 4.85 | 1.0 | 0.1 | 0.55 | — | 6.5 | 37 | 1100 | 5 |

TABLE 2

| | | Crystal Structure | Mn-rich phase Size (μm) | Surface Ratio (%) | Hydrogen Storage Capacity H/M (molar ratio) | Electrode Capacity (mAh/g) 25° C. 0.2 C | 1 C | 3 C | −10° C. 1 C | Capacity Maintenance Ratio (%) Discharge at 25° C., 1 C After 500 cycles |
|---|---|---|---|---|---|---|---|---|---|---|
| Ex. | 1 | CaCu₅ type single phase | 0.5–1.0 | 2.0 | 0.82 | 280 | 238 | 210 | 178 | 81 |
| | 2 | CaCu₅ type single phase | 0.5–1.0 | 3.0 | 0.81 | 278 | 250 | 222 | 200 | 86 |
| | 3 | CaCu₅ type single phase | 0.5–1.3 | 4.0 | 0.81 | 275 | 261 | 234 | 222 | 85 |
| | 4 | CaCu₅ type single phase | 0.7–1.3 | 4.5 | 0.80 | 272 | 258 | 231 | 220 | 85 |
| | 5 | CaCu₅ type single phase | 1.0–2.0 | 5.0 | 0.78 | 270 | 256 | 230 | 218 | 80 |
| | 6 | CaCu₅ type single phase | 0.5–1.3 | 4.1 | 0.80 | 273 | 259 | 232 | 220 | 92 |
| | 7 | CaCu₅ type single phase | 0.5–1.3 | 4.2 | 0.80 | 274 | 260 | 233 | 221 | 90 |
| | 8 | CaCu₅ type single phase | 0.5–1.0 | 3.5 | 0.79 | 270 | 255 | 240 | 230 | 86 |
| | 9 | CaCu₅ type single phase | 0.5–1.0 | 3.5 | 0.79 | 270 | 255 | 240 | 230 | 86 |
| | 10 | CaCu₅ type single phase | 0.5–1.0 | 3.5 | 0.83 | 280 | 265 | 240 | 230 | 85 |
| | 11 | CaCu₅ type single phase | 0.4–1.0 | 1.5 | 0.89 | 300 | 270 | 250 | 240 | 83 |
| Comp. Ex. | 1 | CaCu₅ type single phase | no precipitate | 0 | 0.83 | 280 | 218 | 140 | 109 | 78 |
| | 2 | Ni-rich phase generated | no precipitate | 0 | 0.60 | 200 | 170 | 120 | 136 | 42 |
| | 3 | Ni-rich phase generated | 1–9 | 15 | 0.50 | 175 | 136 | 88 | 68 | 50 |
| | 4 | CaCu₅ type single phase | 0.1–0.2 | 3.9 | 0.80 | 270 | 256 | 230 | 218 | 68 |
| | 5 | CaCu₅ type single phase | 0.1–0.2 | 0.3 | 0.77 | 260 | 247 | 221 | 210 | 70 |
| | 6 | CaCu₅ type single phase | 2–6 | 0.1 | 0.72 | 245 | 233 | 208 | 198 | 69 |

What is claimed is:

1. A rare earth metal-nickel hydrogen storage alloy of a composition represented by the formula:

$$RNi_aMn_bCo_cAl_dX_e$$

wherein R stands for one or more rare earth elements including Sc and Y, not less than 95 atom % of which is one or more elements selected from the group consisting of La, Ce, Pr, and Nd; X stands for one or more elements selected from the group consisting of Fe, Cu, Zn, V, and Nb; a, b, c, d, and e satisfy the relations of $3.9 \leq a < 6.0$, $0.45 \leq b < 1.5$, $0.01 \leq c < 0.3$, $0.4 \leq d \leq 1$, $0 \leq e \leq 0.2$, and $5.2 \leq a+b+c+d+e \leq 7.5$, said alloy having a matrix of CaCu₅ structure, and a Mn-rich secondary phase of 0.3 to 5 μm finely dispersed in said matrix at surface ratio of 0.3 to 7%.

2. The hydrogen storage alloy of claim 1 wherein a is $4.5 \leq a \leq 5.5$, b is $0.7 \leq b \leq 1.3$, c is $0.02 \leq c \leq 0.2$, d is $0.5 \leq d \leq 0.7$, and $6 < a+b+c+d+e \leq 7$.

3. The hydrogen storage alloy of claim 1 wherein said Mn-rich secondary phase is 0.5 to 2 μm in size.

4. The hydrogen storage alloy of claim 1 wherein the surface ratio of said Mn-rich secondary phase is 1 to 7%.

5. A method for producing the rare earth metal-nickel hydrogen storage alloy of claim 1 comprising the steps of:
   (a) supplying onto a roll with a surface roughness of 7 to 100 μm in ten-point mean roughness (Rz) an alloy melt of a composition represented by the formula:

$$RNi_aMn_bCo_cAl_dX_e$$

wherein R stands for one or more rare earth elements including Sc and Y, not less than 95 atom % of which is one or more elements selected from the group consisting of La, Ce, Pr, and Nd; X stands for one or more elements selected from the group consisting of Fe, Cu, Zn, V, and Nb; a, b, c, d, and e satisfy the relations of $3.9 \leq a < 6.0$, $0.45 \leq b < 1.5$, $0.01 \leq c < 0.3$, $0.4 \leq d \leq 1$, $0 \leq e \leq 0.2$, and $5.2 \leq a+b+c+d+e \leq 7.5$, to solidify said alloy melt into an alloy of 0.02 to 0.5 mm in thickness, and
   (b) heating said alloy at 700 to 950° C. for 0.1 to 12 hours under vacuum or inert atmosphere.

6. The method of claim 5 wherein said roll has a surface roughness of 10 to 40 μm in ten-point mean roughness (Rz).

7. The method of claim 5 wherein said alloy melt is solidified on said roll surface in step (a) at a cooling rate of 1000 to 10000° C./sec.

8. The method of claim 5 wherein said heating in step (b) is carried out at 800 to 900° C. for 3 to 10 hours.

9. An anode for a nickel-hydrogen rechargeable battery comprising as anode materials the rare earth metal-nickel hydrogen storage alloy of claim 1 and an electrically conductive material.

10. The anode for a nickel-hydrogen rechargeable battery of claim 9 wherein content of said electrically conductive material is 5 to 20% by weight of said anode materials, and content of said rare earth-metal nickel hydrogen storage alloy of claim 1 is 70 to 95% by weight of said anode materials.

11. The anode for a nickel-hydrogen rechargeable battery of claim 9 further comprising a binder.

12. The hydrogen storage alloy of claim 1, wherein $4.3 \leq a \leq 5.5$, $0.7 \leq b \leq 1.3$, $0.02 \leq c \leq 0.2$, $0.5 \leq d \leq 0.7$, and $5.7 \leq a+b+c+d+e \leq 7.5$.

13. The method of claim 5, wherein said heating in step (b) is carried out at 700 to 900° C. for 3 to 12 hours.

14. The method of claim 5, wherein said heating in step (b) is carried out at 800 to 900° C. for 3 to 12 hours.

15. The anode of claim 9, wherein $4.3 \leq a \leq 5.5$, $0.7 \leq b \leq 1.3$, $0.02 \leq c \leq 0.2$, $0.5 \leq d \leq 0.7$, and $5.7 \leq a+b+c+d+e \leq 7.5$.

* * * * *